Oct. 16, 1923.
J. RAGGIS
1,471,279
COVER SUPPORT FOR MOTOR VEHICLES
Filed Jan. 19, 1923
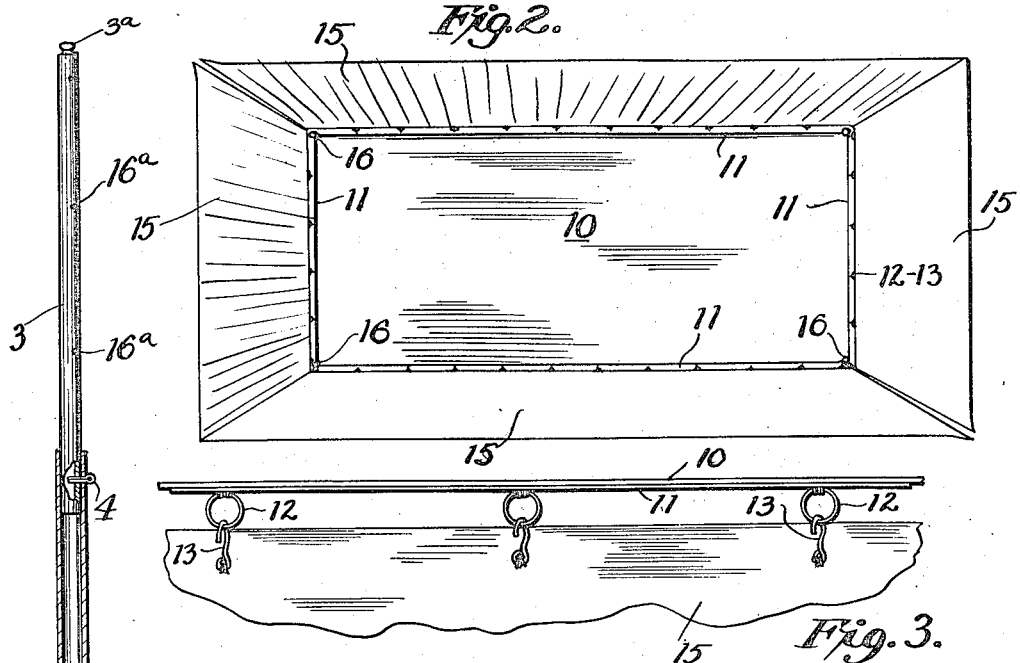
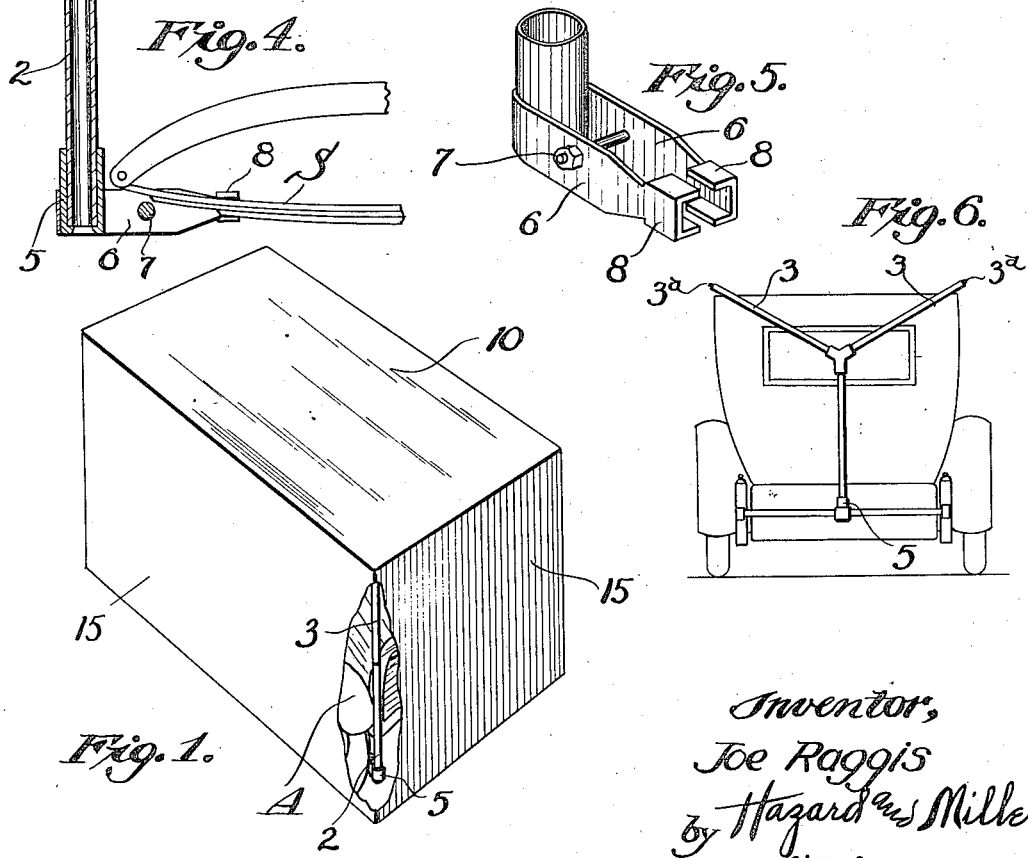
Inventor,
Joe Raggis
by Hazard and Miller
Att'ys Patented Oct. 16, 1923.

1,471,279

UNITED STATES PATENT OFFICE.

JOE RAGGIS, OF LOS ANGELES, CALIFORNIA.

COVER SUPPORT FOR MOTOR VEHICLES.

Application filed January 19, 1923. Serial No. 613,732.

*To all whom it may concern:*

Be it known that I, JOE RAGGIS, a subject of the King of Italy, residing at Los Angeles, in the county of Los Angeles and State of California, have invented new and useful Improvements in Cover Supports for Motor Vehicles, of which the following is a specification.

This invention relates to vehicle covers and supports therefor.

It is an object of the present invention to provide a collapsible form of support and means for readily attaching the same to a vehicle so that a cover may be supported in effective closing position over and above the vehicle, such particularly as automobiles.

Other objects and advantages will be made manifest in the following specification of an embodiment of the invention illustrated in the accompanying drawings, wherein Figure 1 is a perspective showing the cover as set up and supported about an automobile, a part of the cover being broken away.

Fig. 2 is an underneath perspective of the cover.

Fig. 3 is a detail showing fragments of the top and side members of the cover.

Fig. 4 is a longitudinal section and elevation of one of the corner posts forming a supporting element.

Fig. 5 is a perspective of a clamp for attaching a corner post to a contiguous part of the automobile.

Fig. 6 shows a varient form of mounting.

As here shown the invention consists of a sectional post including a lower, preferably, tubular section 2 and an upper section 3 which is adapted to be inserted, at its lower end, in the upright section 2 and secured thereto as by a cotter pin 4 or other suitable device. A set of these supporting posts is provided so that one may be mounted in upright position at each corner of a vehicle, such as an automobile indicated at A in Fig. 1, which is adapted to be enclosed or covered.

For conveniently attaching the supporting posts, each is here shown as provided at its lower end with a socket 5 having a pair of parallel arms 6 through which are transversely passed a clamping bolt 7 whereby the outer ends of the arms, which are provided with clamp jaws 8, can be tightly drawn into gripping position on a convenient portion of the automobile as here shown by the springs S.

After the supporting posts have been erected, a suitable tent-like covering or closure is adapted to be mounted on the same, and this is shown as including a top sheet 10 which is provided at its margins with a substantial strip or tape 11, and this is provided with a number of rings or other suitable fastening or attaching means 12 which are adapted to receive simple hooks or other devices 13 attached at suitably spaced positions along vertical end and side walls 15 of the tent or cover.

It will be seen that the cover top 10 may be laid over the top of the vehicle, and the end and side panels 15 then arranged around the vehicle and readily attached to the suspending connecting means here shown as including hooks and eyes or rings. The corners of the top strip 11 may be provided with sockets 16 to be snapped down over buttons 3ª provided on the upper ends of the supporting post sections 3. If desired, the contiguous edges of the sides and ends 15 of the cover can be fastened to the post as by suitable fastening means indicated at 16.

The pole sections 3 may be provided with a plurality of apertures 16ª to receive the cotter pins 4, therefore, enabling suitable vertical adjustment of the parts.

Further embodiments, modifications and changes may be resorted to within the spirit of the invention as here claimed.

What is claimed is:

1. A cover support for motor vehicles comprising a set of posts adapted to be erected at the corners of the vehicle, and means for fastening the lower portions of the posts to convenient parts of the vehicle.

2. A cover support for motor vehicles comprising a set of posts adapted to be erected at the corners of the vehicle, and means for fastening the lower portions of the posts to convenient parts of the vehicle, said posts being of sectional form so as to be knocked down for compact storage.

3. A cover support for motor vehicles comprising a sectional post, a socket on the lower end of said post, and clamp means for fastening the socket to a contiguous convenient part of the automobile upon which the support is to be set.

4. A cover support for motor vehicles comprising a sectional post, a socket on the lower end of said post, and clamp means for fastening the socket to a contiguous convenient part of the automobile upon which the support is to be set, said clamp including spaced arms having clamping jaws.

5. In combination, an automobile cover including a top member and side and end members detachably connectable, supporting posts adapted to be detachably connected to convenient parts of an automobile in upright position, and means for connecting the cover to the posts.

In testimony whereof I have signed my name to this specification.

JOE RAGGIS.